(12) United States Patent
Wu

(10) Patent No.: US 9,176,545 B2
(45) Date of Patent: Nov. 3, 2015

(54) LOCKING APPARATUS FOR PANELS OF COMPUTER DEVICE

(71) Applicant: ShenZhen Goldsun Network Intelligence Technology Co., Ltd., Shenzhen (CN)

(72) Inventor: Lin-Han Wu, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 128 days.

(21) Appl. No.: 14/059,678

(22) Filed: Oct. 22, 2013

(65) Prior Publication Data

US 2014/0182344 A1 Jul. 3, 2014

(30) Foreign Application Priority Data

Dec. 29, 2012 (CN) .......................... 2012 1 5889408

(51) Int. Cl.
*G06F 1/16* (2006.01)
*G06F 1/18* (2006.01)
(52) U.S. Cl.
CPC ............. *G06F 1/181* (2013.01); *Y10T 70/7486* (2015.04)

(58) Field of Classification Search
CPC ........ H05K 5/0221; G06F 1/181; G06F 1/182
USPC ...................................................... 361/679.57
See application file for complete search history.

(56) References Cited

U.S. PATENT DOCUMENTS

| 5,948,074 A * | 9/1999 | Ninomiya .......................... 710/2 |
| 6,246,572 B1 * | 6/2001 | Myers et al. ............. 361/679.57 |
| 2005/0286218 A1 * | 12/2005 | Kim .............................. 361/686 |

* cited by examiner

*Primary Examiner* — Anthony Q Edwards
(74) *Attorney, Agent, or Firm* — Novak Druce Connolly Bove + Quigg LLP

(57) ABSTRACT

A locking apparatus is configured to lock a first panel and a second panel to a computer device. The locking apparatus includes a lock rotatable between a first position and a second position, a mounting panel, a driving lever pivotably attached on the mounting panel, a blocking member attached to the mounting panel, and a latch member. When moved to the first position, the rotatable post rotates the driving lever, the driving lever pushes the latch member to unlatch from the second panel, and the rotatable post is disengaged from the blocking member to unlock the first panel. When moved to the second position, the rotatable post is blocked by the blocking member for locking the first panel, the driving lever is rotated to its original position, and the latch member latches the second panel.

20 Claims, 4 Drawing Sheets

LOCKING APPARATUS FOR PANELS OF COMPUTER DEVICE

BACKGROUND

1. Technical Field

The present disclosure relates to a locking apparatus for panels of a computer device.

2. Description of Related Art

A computer device includes a frame, a front panel attached to a front side of the frame, and a rear panel attached to a rear side of the frame. The installation of the front panel and the rear panel to the frame usually involves the use of screws, which is inconvenient.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean "at least one."

Figure 1:
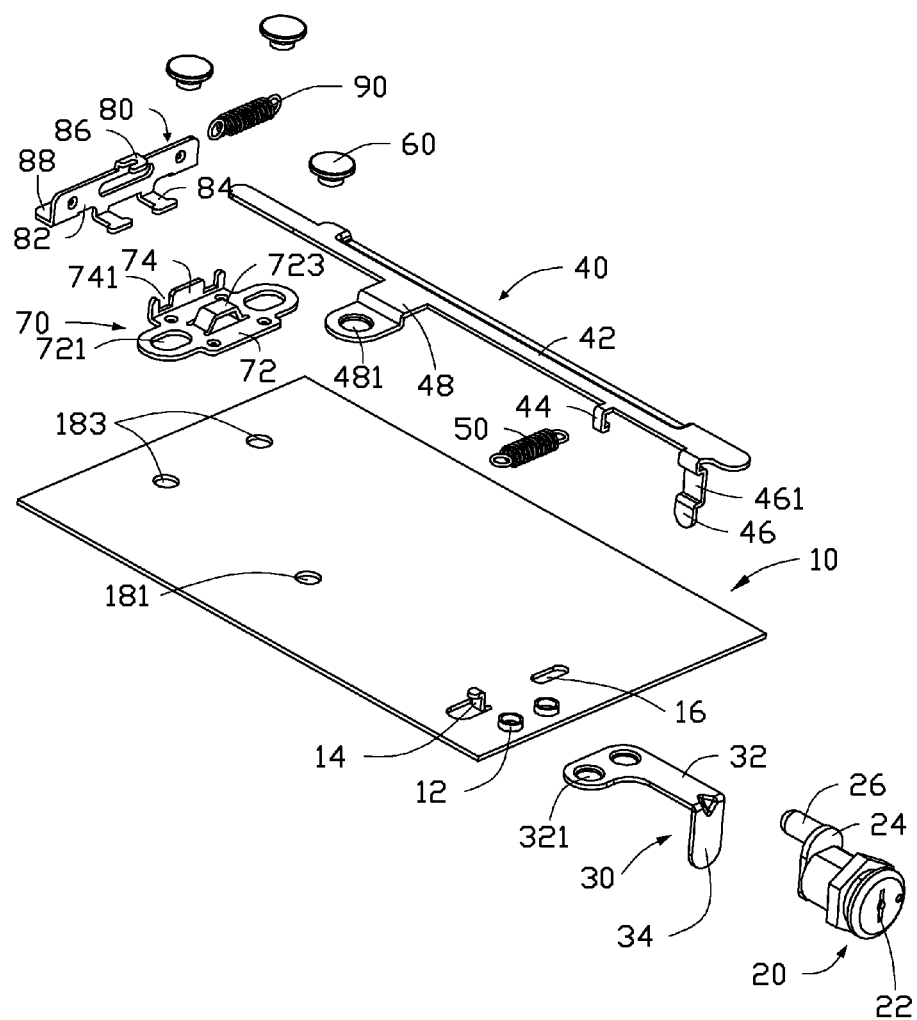
FIG. 1 is an exploded view of an embodiment of a locking apparatus.
Figure 2:
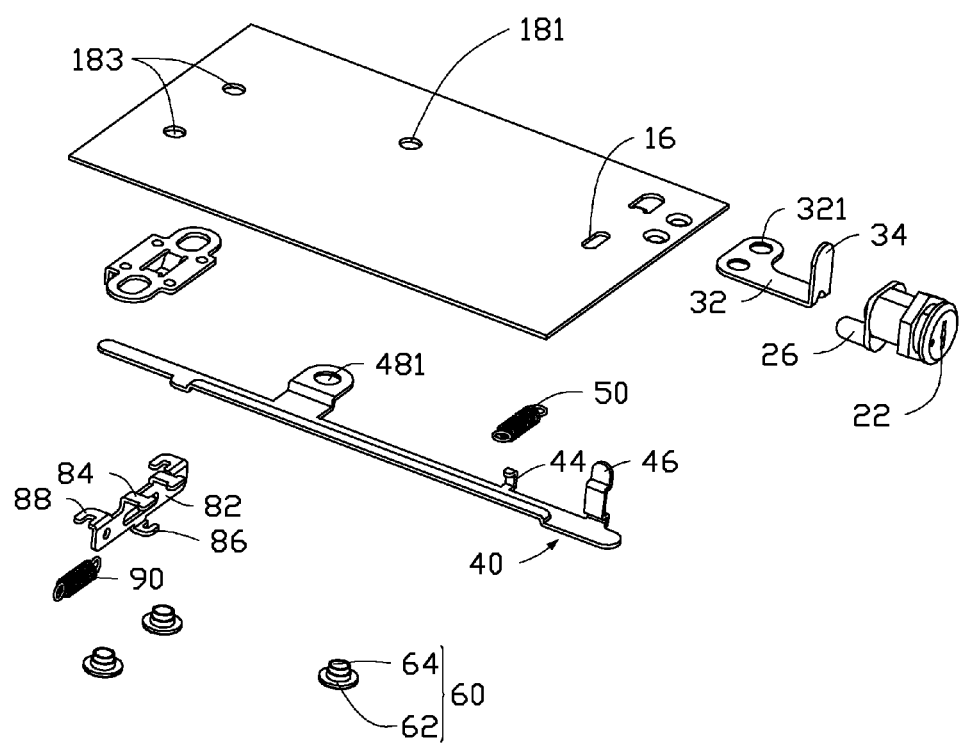
FIG. 2 is similar to FIG. 1, but viewed from another aspect.

FIGS. 1 and 2 show an embodiment of a locking apparatus, which includes a mounting panel 10, a lock 20, a blocking member 30, a driving lever 40, a first spring 50, a driving member 70, a latch member 80, and a second spring 90.

A pair of mounting posts 12 protrudes from the mounting panel 10 for mounting the blocking member 30. The mounting panel 10 has a substantially rectangular shape. A clamping piece 14 extends from the mounting panel 10 for clamping one end of the first spring 50. The clamping piece 14 is substantially L-shaped. A sliding slot 16 is defined in the mounting panel 10. The pair of mounting posts 12 is located adjacent to a short edge of the mounting panel 10. The sliding slot 16 and the clamping piece 14 are located adjacent to the pair of mounting posts 12. Mounting holes 181 and 183 are defined in the mounting panel 10 for receiving securing members 60.

The lock 20 includes a main body. A key hole 22 is defined in a front side of the main body. A rotatable piece 24 is attached to a rear side of the main body. A rotatable post 26 extends rearward from the rotatable piece 24.

The blocking member 30 includes an L-shaped main body 32, and a blocking piece 34 extends substantially perpendicularly from the L-shaped main body 32. A pair of mounting holes 321 is defined in the L-shaped main body 32.

The driving lever 40 includes a long narrow main piece 42, a clamping piece 44 extending substantially perpendicularly from the long narrow main piece 42, a resisting piece 46 extending substantially perpendicularly from the long narrow main piece 42, and a mounting piece 48 extending from the long narrow main piece 42 and substantially perpendicularly to the resisting piece 46 and the clamping piece 42. A mounting hole 481 is defined in the mounting piece 48. The resisting piece 46 is located adjacent to a first end of the long narrow main piece 42 and includes a U-shaped depression 461. The mounting piece 48 is located adjacent to a central portion of the long narrow main piece 42. The clamping piece 44 is located between the resisting piece 46 and the mounting piece 48.

The driving member 70 includes a base panel 72 and a flange 74 extending substantially perpendicularly from the base panel 72. A pair of mounting slots 721 is defined in the base panel 72. An arch portion 723 protrudes from the base panel 72. A pair of gaps 741 is defined in the flange 74. Each securing member 60 includes a head 62 and a mounting post 64 extending from the head 62. A length of each of the pair of mounting slots 721 is greater than a diameter of the mounting post 64.

The latch member 80 includes a main piece 82, a pair of hooks 88 extending from a first long edge of the main piece 82 along a first direction, and a pair of latch pieces 84 extending from the first long edge of the main piece 82 along a second direction that is opposite to the first direction. The first direction and the second direction are both substantially perpendicular to the main piece 82. The pair of hooks 88 is adjacent to opposite ends of the main piece 82. The pair of latch pieces 84 is located between the pair of hooks 88. A clamping piece 86 extends from a central portion of a second long edge of the main piece 82 along the second direction. Each of the pair of hooks 88 is substantially U-shaped. The clamping piece 86 is also substantially U-shaped. Each of the pair of latch pieces 84 is substantially T-shaped.

Figure 3:
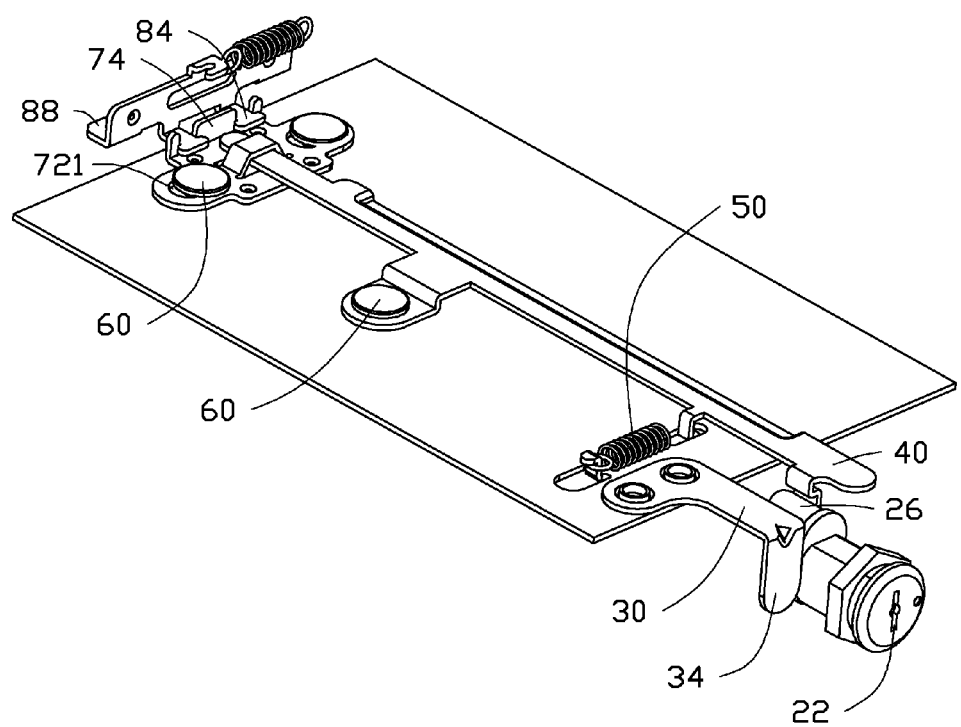
FIG. 3 is an assembled view of the locking apparatus of FIG. 1.
Figure 4:
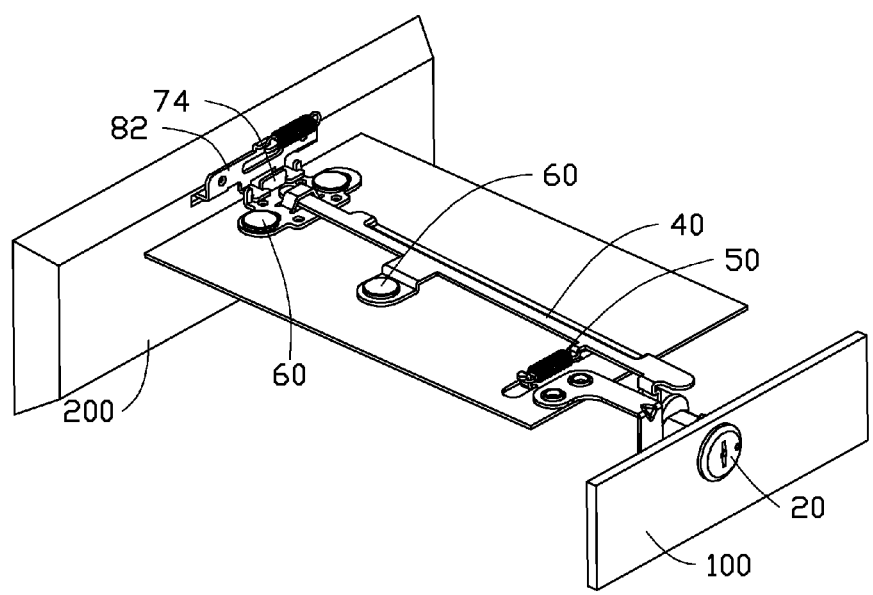
FIG. 4 illustrates a first panel and a second panel which are lockable by the locking apparatus of FIG. 3.

Referring to FIGS. 3 and 4, in assembly, the lock 20 is secured to a first panel 100. The pair of mounting posts 12 are received by the pair of mounting holes 321 of the blocking member 30 to mount the blocking member 30 to the mounting panel 10. The blocking member 30 partially protrudes out from the mounting panel 10. The blocking piece 34 is spaced from the mounting panel 10 and is substantially perpendicular to the mounting panel 10. The mounting hole 481 of the driving lever 40 is aligned with the mounting hole 181. One securing member 60 is received in the mounting holes 481 and 181 for pivotably mounting the driving lever 40 on the mounting panel 10. One end of the first spring 50 is attached to the clamping piece 14. The other end of the first spring 50 is attached to the clamping piece 44. The clamping piece 44 is slidably received in the sliding slot 16. A second end of the long narrow main piece 42 is received by the arch portion 723 of the driving member 70. The pair of mounting slots 721 is aligned with the mounting holes 183. Two mounting members 60 are received by the pair of mounting slots 721 and the mounting holes 183. Thus, the driving member 70 is movably attached on the mounting panel 10. The pair of latch pieces 84 is received by the pair of gaps 741 for preventing the latch member 80 from moving away from the driving member 70 along the first direction along which the pair of hooks 88 extends. One end of the second spring 90 is attached to the clamping piece 86.

Referring to FIGS. 3 and 4, the pair of hooks 88 of the latch member 80 is latched in a second panel 200. When the rotatable post 26 is rotated clockwise to a first position by a key (not shown) received in the key hole 22, the rotatable post 26 is received in the U-shaped depression 461. The rotatable post 26 can push the driving lever 40 to rotate counter-clockwise.

The first spring 50 and the second spring 90 are stretched, and the pair of hooks 88 is moved to unlatch from the second panel 200. Thus, the lock 20 is in an unlocked position, and the first panel 100 and the second panel 200 are removable from the locking apparatus.

When the rotatable post 26 is rotated counter-clockwise from the first position to a second position, the first spring 50 and the second spring 90 bias the driving shaft 40 to move clockwise, and the second panel 200 is latched by the pair of hooks 88. The rotatable post 26 is blocked by the blocking piece 34 for preventing the first panel 100 from moving along the second direction to be disengaged from the locking apparatus. When unlocking and locking the locking apparatus, the clamping piece 44 is moves along the sliding slot 16, and the two mounting members 60 received in the mounting slots 721 also move.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A locking apparatus, comprising:
   a lock, configured for locking a first panel, and comprising a rotatable post that is rotatable between a first position and a second position;
   a mounting panel;
   a driving lever pivotably attached on the mounting panel;
   a blocking member attached to the mounting panel;
   a latch member, configured for locking a second panel;
   wherein when the rotatable post is in the first position, the rotatable post is capable of urging the driving lever to rotate away from its original position, the driving lever is capable of urging the latch member moving to an unlocked position for unlock the second panel, and the rotatable post is disengaged away from the blocking member for unlocking the first panel;
   and when the rotatable post is in the second position, the rotatable post is blocked by the blocking member for locking the first panel, the driving lever is capable of rotating to its original position, and the latch member is capable of moving to a lock position to lock the second panel.

2. The locking apparatus of claim 1, further comprising a driving member movably mounted on the mounting panel, wherein the driving member comprises an arch portion through which the driving lever extends.

3. The locking apparatus of claim 2, wherein at least one gap is defined in the driving member, and the latch member comprises at least one latch piece engaged with the at least one gap.

4. The locking apparatus of claim 3, wherein a moving direction of the driving member is the same as a moving direction of the latch member.

5. The locking apparatus of claim 4, wherein at least one mounting slot is defined in the driving member, at least one mounting hole is defined in the mounting panel, and a securing member extends through the at least one mounting slot and the at least one mounting hole.

6. The locking apparatus of claim 5, wherein the securing member comprises a head and a mounting post extending from the head, a length of the at least one mounting slot is greater than a diameter of the mounting post, and the mounting post is slidable along the at least one mounting slot relative to the driving member.

7. The locking apparatus of claim 1, further comprising a spring connected to the driving lever for urging the driving lever to return its original position.

8. The locking apparatus of claim 7, wherein a first clamping piece extends from the mounting panel for clamping one end of the spring, and the driving lever comprises a second clamping piece for clamping the other end of the spring.

9. The locking apparatus of claim 8, wherein a sliding slot is defined in the mounting panel, and the second clamping piece is slidably received in the sliding slot.

10. The locking apparatus of claim 9, wherein the driving lever further comprises a resisting piece, and the rotatable post is resisted against the resisting piece in the first position.

11. A locking apparatus of a computer device comprising:
    a lock, mounted to a first panel, and comprising a rotatable post that is rotatable between a first position and a second position;
    a latch member, configured to lock a second panel that is substantially parallel to the first panel;
    a mounting panel located between the first panel and the second panel;
    a driving lever pivotably attached on the mounting panel; and
    a blocking member attached to the mounting panel;
    wherein in the first position, the rotatable post is capable of urging the driving lever to rotate away from its original position; the driving lever is capable of urging the latch member moving to an unlocked position for unlock the second panel; and the rotatable post is disengaged away from the blocking member for unlocking the first panel; and in the second position, the rotatable post is blocked by the blocking member for locking the first panel, the driving lever is capable of rotating to its original position, and the latch member is capable of moving to a lock position to lock the second panel.

12. The locking apparatus of claim 11, further comprising a driving member movably mounted on the mounting panel, wherein the driving member comprises an arch portion through which the driving lever extends.

13. The locking apparatus of claim 12, wherein at least one gap is defined in the driving member, and the latch member comprises at least one latch piece engaged with the at least one gap.

14. The locking apparatus of claim 13, wherein a moving direction of the driving member is the same as a moving direction of the latch member.

15. The locking apparatus of claim 14, wherein at least one mounting slot is defined in the driving member, at least one mounting hole is defined in the mounting panel, and a securing member extends through the at least one mounting slot and the at least one mounting hole.

16. The locking apparatus of claim 15, wherein the securing member comprises a head and a mounting post extending from the head, a length of the at least one mounting slot is greater than a diameter of the mounting post, and the mounting post is slidable along the at the one mounting slot relative to the driving member.

17. The locking apparatus of claim 11, further comprising a spring connected to the driving lever for urging the driving lever to return its original position.

18. The locking apparatus of claim 17, wherein a first clamping piece extends from the mounting panel for clamping one end of the spring, and the driving lever comprises a second clamping piece for clamping the other end of the spring.

19. The locking apparatus of claim 18, wherein a sliding slot is defined in the mounting panel, and the second clamping piece is slidably received in the sliding slot.

20. The locking apparatus of claim 19, wherein the driving lever further comprises a resisting piece, and the rotatable post is resisted against the resisting piece in the first position.

* * * * *